OR    3,973,828

United States Patent
Onoda et al.

[11] 3,973,828
[45] Aug. 10, 1976

[54] OPTICAL WAVE GUIDE
[75] Inventors: Seiichi Onoda, Tokorozawa; Mitsuo Tanaka, Ohme; Katsuyuki Imoto, Sayama, all of Japan
[73] Assignee: Hitachi, Ltd., Japan
[22] Filed: June 4, 1974
[21] Appl. No.: 476,311

[30] Foreign Application Priority Data
June 4, 1973   Japan................. 48-61957

[52] U.S. Cl. .................... 350/96 WG; 350/96 R
[51] Int. Cl.² ................................. G02B 5/14
[58] Field of Search ...... 350/96 WG, 96 R, 175 GN

[56] References Cited
UNITED STATES PATENTS

| | | |
|---|---|---|
| 3,434,774 | 3/1969 | Miller.................... 350/96 WG |
| 3,436,141 | 4/1969 | Comte ................... 350/96 WG UX |
| 3,583,786 | 6/1971 | Marcatili ................ 350/96 WG |
| 3,647,406 | 3/1972 | Fisher .................... 350/175 GN UX |
| 3,711,262 | 1/1973 | Keck et al. ............. 350/96 WG UX |
| 3,778,132 | 12/1973 | Pinnow et al. ......... 350/96 WG |

Primary Examiner—John K. Corbin
Assistant Examiner—Stewart Levy
Attorney, Agent, or Firm—Craig & Antonelli

[57]   ABSTRACT

An optical wave guide comprises a cylindrical body which is made of a first transparent dielectric, and a second transparent dielectric which is concentrically formed on the outer periphery of the cylindrical body and which has an index of refraction lower than that of the first dielectric, the central part of the wave guide being hollow.

5 Claims, 16 Drawing Figures

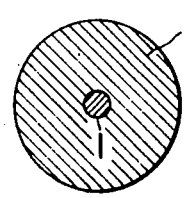
FIG. IA
PRIOR ART
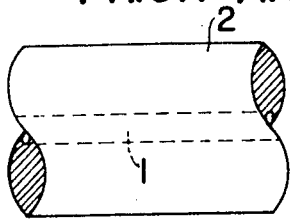
FIG. IB
PRIOR ART
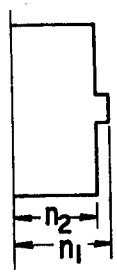
FIG. IC
PRIOR ART
INDEX OF REFRACTION
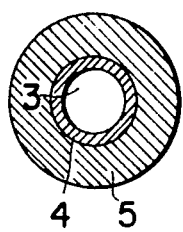
FIG. 2A
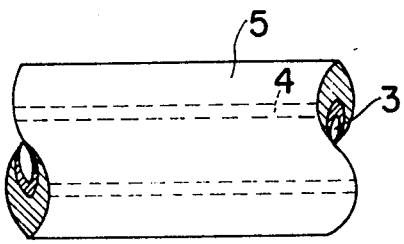
FIG. 2B
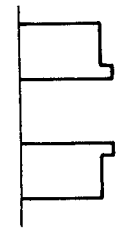
FIG. 2C
INDEX OF REFRACTION
FIG. 3A
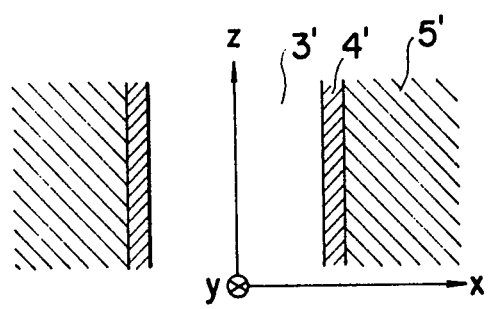
FIG. 3B
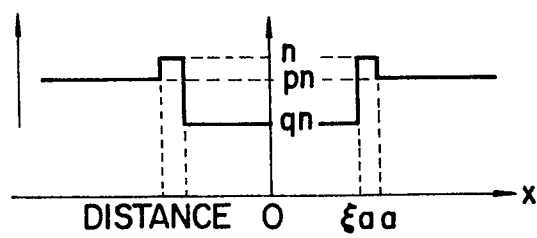
DISTANCE

OPTICAL WAVE GUIDE

BACKGROUND OF THE INVENTION

1. Field of the Invention

The present invention relates to an optical wave guide or optical fiber made of a transparent dielectric such as glass and to be used as a transmission line for optical communication.

2. Description of the Prior Art

As a transmission line in the field of optical communications, an optical wave guide made of a fiber of such transparent dielectric as glass (usually called an optical fiber) is being developed. Important factors of a transmission line for optical communications are that the transmission loss is low, the transmission band is wide, connection is easy, maintenance is easy, and transmission characteristics are stable or they do not fluctuate due to external conditions.

An effective optical fiber having hitherto been known is the so-called clad type. This optical fiber is made up of a core portion whose optical refractive index is comparatively high, and a clad portion whose refractive index is somewhat lower than that of the core portion. Light waves propagating through the interior of the optical fiber have a mode similar to electromagnetic waves within a wave guide. Depending on the transmission mode or modes of light, the optical fiber can be classified into a single mode fiber and a multi-mode fiber.

The single mode fiber has a single transmission mode, and is free from the group delay difference between modes. It is therefore advantageous in having a wide transmission band. The transmission bandwidth is as large as several GHz at a transmission distance over 1 km. On the other hand, in order to transmit light in the single mode, it is necessary either to keep the diameter of the core at several microns or to make the difference in the refractive index between the core and the clad small. With such a small core diameter, it is extremely difficult to project light into the core of the optical fiber and to align optical fibers when they are to be connected. The small difference in the refractive index brings about the disadvantage that the emission loss due to bending of the optical fiber is great. The disadvantage causes serious bottlenecks in the practical use of the single mode fiber.

On the other hand, the multi-mode fiber obviates the foregoing disadvantages of the single mode fiber fairly well. Since, however, the many modes have differing transmission speeds, the trasmission band is limited by the group delay differences among the modes. For this reason, the important requirement for a communication line in that the light transmission line has a wide transmission band is lost. The limited bandwidth is also a great obstruction in putting optical fibers into practical use. Although a variety of countermeasures have been proposed, a practical available measure has not been realized yet.

SUMMARY OF THE INVENTION

It is, accordingly, an object of this invention to provide an optical fiber which has a large diameter core and a wide transmission band. A further object of this invention is to provide an optical fiber which is simple in structure and easy to manufacture.

In order to accomplish these objects, the present invention is constructed of a core whose central part is hollow, that is, a tubular core portion which has a higher refractive index, and a clad portion which has a refractive index lower than that of the core portion and which is concentrically formed on the outer periphery of the core portion.

With such a construction, a multiplicity of modes generated when the core diameter is large are caused to degenerate to lower-order modes, to thus realize an optical fiber which has small group delay differences among the modes.

Other objects and various additional features and advantages of the invention will become apparent from the following detailed description of illustrative embodiments thereof as taken in conjunction with the attached drawings.

BRIEF DESCRIPTION OF THE DRAWINGS

FIGS. 1A, 1B and 1C are a sectional view, a partial side view and a distribution diagram of refractive indices, respectively, showing the construction of a prior-art optical fiber;

FIGS. 2A, 2B and 2C are a sectional view, a partial side view and a refractive index distribution diagram of an embodiment of the optical fiber according to the present invention, respectively;

FIGS. 3A and 3B are a partial sectional view and a refractive index distribution diagram of a slab type optical wave guide for explaining the principle of the present invention, respectively;

Figure 4A:
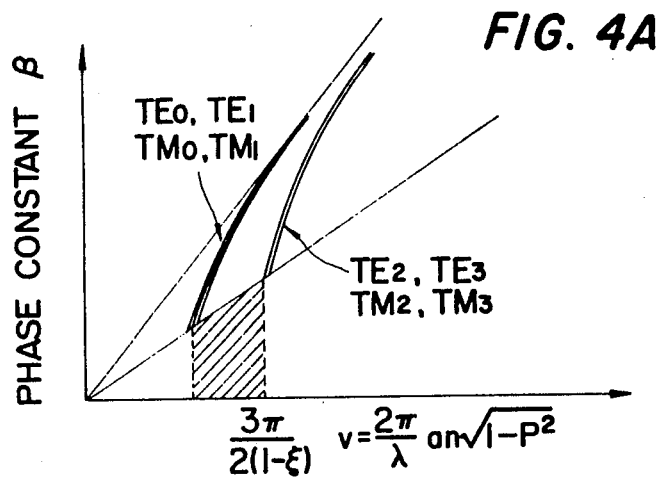
FIGS. 4A and 4B are diagrams of the relations between the normalized frequency $v$ and the phase constant $\beta$ of slab type wave guides for explaining the principle of the present invention.

DESCRIPTION OF THE PREFERRED EMBODIMENTS:

FIGS. 1A, 1B and 1C show the construction of a prior-art clad type optical fiber, and FIG. 1A is a sectional view, FIG. 1B is a side view and FIG. 1C represents the distribution of refractive indices in the diametral direction of the fiber. In the figure, numeral 1 designates a core, and 2 a clad.

With such a construction, the mode in which light propagates is determined by the following expression:

$$\frac{2\pi a}{\lambda} \sqrt{n_1^2 - n_2^2}$$

where a denotes the radius of the core of the wave guide, $\lambda$ the wavelength of the light to be propagated, $n_1$ the refractive index of the core 1, and $n_2$ the refractive index of the clad 2. For brevity of description, the expression will be hereinafter represented as $v_c$. By way of example, when $v_c$ is not greater than 2.405, the transmission mode becomes the single mode $H_{11}$. In order to effect light propagation of single mode, accordingly, the quantities $a$, $n_1$ and $n_2$ may be set at predetermined values. On account of the selection of the values of $n_1$ and $n_2$ or manufacturing conditions, however, the value of $a$ becomes as small as several microns. As the result, the problems previously stated arise, that is, the connection between the fibers and the introduction of light from a light source into the fiber become difficult.

In contrast, the light transmission line (optical fiber) of the present invention is constructed as shown in FIGS. 2A, 2B and 2C. FIG. 2A, FIG. 2B and FIG. 2C are a sectional view, a side view and a refractive index distribution diagram, respectively. In the figures, numeral 3 indicates a hollow portion, numeral 4 a core, and numeral 5 a clad. Although the constituent element 4 is cylindrical, it is termed a "core" for the sake of convenience in the comparison with the prior art. The feature of the construction is that the central part of the core is made hollow, whereby the refractive index of this part is made much lower than that of the clad.

In the following explanation of the principal of the present invention, the light transmission line will be regarded as a slab type of five layers in order to make the explanation brief. Since the analysis of the cylindrical type is generally very complicated, its characteristics are often explained using the slab type transmission line. Also, in the present invention, the operation of the slab type transmission line is applicable according to the technical idea of the invention.

FIGS. 3A and 3B illustrate a slab type light transmission line having five layers. FIG. 3A is a sectional side elevation of the light transmission line, while FIG. 3B is a refractive index distribution diagram taken in the x-direction in FIG. 3A. Symbols 3', 4' and 5' correspond to the hollow portion 3, the core 4 and the clad 5 in FIGS. 2A–2C, respectively. The propagating direction of light is assumed to be the y-direction, that is, to be into the drawing. The length from the center of the hollow portion to the inner wall of the core portion 4' is represented by $\xi a$, while the length from the center to the outer wall of the core portion 4' is denoted by $a$. The refractive indices of the portions 3', 4' and 5' are $qn$, $n$ and $pn$, respectively. The thickness of the clad portion 5' is regarded as being infinite. In such a wave guide, TE (transverse electric) and TM (transverse magnetic) modes exist. The field components $\psi_y$ in the y-direction are set forth below.

$$\begin{aligned}
\psi_y &= C_1 \{ \exp(u_i x/a) \pm \exp(-u_i x/a) \} \ldots |x| > \xi a \\
&= C_2 \cos(u_i x/a) + C_3 \sin(-u_i x/a) \ldots \xi a < x < a \\
&= C_2 \cos(u_i x/a) \pm C_3 \sin(u_i x/a) \ldots -a < x < -\xi a \\
&= C_4 \exp(-u_2 x/a) \ldots a < x \\
&= \pm C_4 \exp(u_2 x/a) \ldots x < -a
\end{aligned} \quad (1)$$

Here, the progagation term $\exp\{j(\beta z - \omega t)\}$ has been omitted. $C_1$–$C_4$ indicate unknown coefficients, while $u_i$, $u_1$, and $u_2$ the eigenvalues of the respective layers 3', 4' and 5'. The plus and minus of the double sign ($\pm$) correspond to the even mode and odd mode, respectively. $\psi_y$ corresponds to the TE and TM modes. In order that the above equation may satisfy a wave equation, the following must hold among the eigenvalues:

$$(u_i/a)^2 + k_i^2 = -(u_1/a)^2 + k_1^2 = (u_2/a)^2 + k_2^2 = \beta^2 \quad (2)$$

$$k_i = qn\, k_o,\; k_1 = n\, k_o,\; k_2 = pn\, k_o,\; k_o = \frac{2\pi}{\lambda} = \omega/c$$

where $c$ denotes the velocity of light.

From the above relations, the following is obtained:

$$u_i^2 = A^2 u_1^2 + B^2 u_2^2,\; A^2 = \frac{p^2 - q^2}{1 - p^2},\; B^2 = \frac{1 - q^2}{1 - p^2} \quad (3)$$

Here the normalized frequency $v$ is defined as below.

$$v^2 = u_1^2 + u_2^2 = \sqrt{1 - p^2}\, n\, k_o\, a = 2\pi n a \sqrt{1 - p^2}/\lambda$$

Definition equations are obtained from these equations, as follows:

For the TE wave, $$\tan(1-\xi) u_1 = \frac{u_1 u_2 + u_i u_1 \left(\begin{smallmatrix}\tanh\\\coth\end{smallmatrix}\right) \xi u_i}{u_1^2 - u_i u_1^2 \left(\begin{smallmatrix}\tanh\\\coth\end{smallmatrix}\right) \xi u_i} \quad (4)$$

For the TM wave, $$\tan(1-\xi) u_1 = \frac{q^2 u_1 u_2 + p^2 u_i u_1 \left(\begin{smallmatrix}\tanh\\\coth\end{smallmatrix}\right) \xi u_i}{p^2 q^2 u_1^2 - u_i u_1 \left(\begin{smallmatrix}\tanh\\\coth\end{smallmatrix}\right) \xi u_i} \quad (5)$$

Here $$\left(\begin{smallmatrix}\tanh\\\coth\end{smallmatrix}\right)$$

represents $\tanh$ for the even mode and $\coth$ for the odd mode.

As the boundary condition for propagating light, cutoff can be given by $u_2 = 0$.

At this time, $u_1 = v = v_c$. Equations (4) and (5) become: for the TE wave, $$\tan(1-\xi) v_c = \begin{cases} A \tanh \xi A\, v_c & \text{(even mode)} \\ A \coth \xi A\, v_c & \text{(odd mode)} \end{cases} \quad (6)$$

for the TM wave, $$\tan(1-\xi) v_c = \begin{cases} \frac{A}{q^2} \tanh \xi A\, v_c & \text{(even mode)} \\ \frac{A}{q^2} \coth \xi A\, v_c & \text{(odd mode)} \end{cases} \quad (7)$$

Accordingly, $v_c$s corresponding to the even and odd modes in each of the TE and TM modes are coincident where $\xi A$ in the above equations are large (because $\coth \approx \tanh \approx 1$). Between the TE and TM modes, the mere difference is that the coefficients of the TM modes are $1/q^2$ times as large as those of the TE modes. These may be considered to substantially degenerate.

Consequently, the even mode $TE_0$ as well as the odd mode $TE_1$ of the TE wave and the even mode $TM_0$ as well as the odd mode $TM_1$ of the TM wave (these modes are called the fundamental mode group) may be considered to substantially degenerate.

The condition under which only the fundamental mode group propagates is represented only by the equation:

$$v_c = \frac{2\pi a n \sqrt{1-p^2}}{\lambda} \leq \frac{3\pi}{2(1-\xi)}$$

Corresponding here to the prior art clad type optical wave guide is a case where $\xi = 0$. In this case, although $TE_o$ and $TM_o$ substantially degenerate, $TE_1$ and $TM_1$ do not degenerate. More specifically, the characteristics of the frequencies $v_c$ and phase constants $\beta$ of the respective modes are almost equal for $TE_o$ and $TM_o$, whereas they are very different for $TE_1$ and $TM_1$. The condition under which only $TE_o$ and $TM_o$ propagate is given by:

$$v_c = \frac{2\pi a n \sqrt{1-p^2}}{\lambda} = \frac{\pi}{2}$$

Figure 4B:
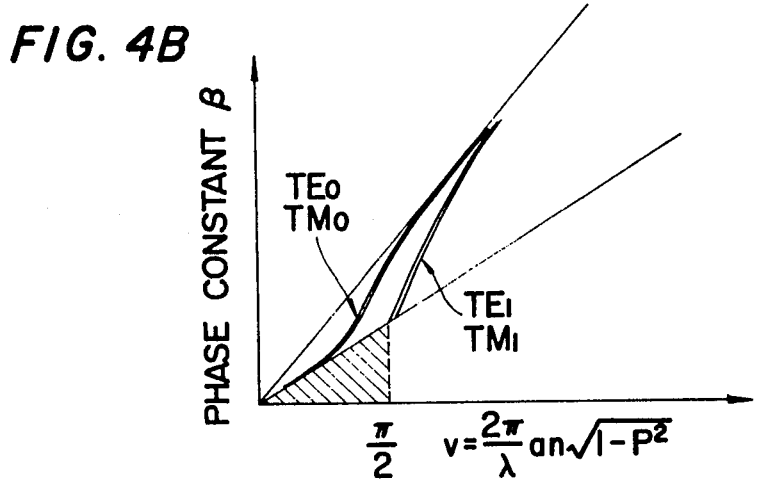

These relations are shown as graphs in FIGS. 4A and 4B. FIG. 4A corresponds to the present invention, and FIG. 4 B to the prior art clad type. In the 5-layer slab type, the characteristics of the $TM_o$, $TE_1$ and $TM_1$ modes approximate to that of the lowest-order mode $TE_o$, and only these modes propagate in the range in which $v$ is up to $$\frac{3\pi}{2(1-\xi)}$$

In the 3-layer slab type corresponding to the prior art, only $TM_o$ approximates to the lowest-order mode $TE_o$, and only $TE_o$ and $TM_o$ propagate in the range in which $v$ is up to $\pi/2$.

The 5-layer slab type is therefore $3/(1-\xi)$ times as large as the 3-layer slab type in the range of $$v = \frac{2\pi}{\lambda} a \sqrt{1-p^2}$$

in the cse where only the lowest-order mode group for which the group delay between modes is negligible can propagate. As a consequence, upon the condition that refractive index differences are equal, that is, when p is fixed, the size a of the core can be made $3/(1-\xi)$ times larger. For example, at $\xi = 0.9$, a becomes 30 times larger.

As previously stated, although the propagation mode is not the single mode in the light transmission line of the present invention, lower-order ones of higher order modes, for example, $TM_o$, $TE_1$ and $TM_1$ degenerate to $TE_o$ and have values essentially approximate to the phase constant of the $TE_o$ mode. Hence, the group delay difference $\Delta\tau$ among the modes is very small. When the modes $TE_o$, $TE_1$, $TM_o$, and $TM_1$ propagate in the 5-layer slab, the group delay difference can approximately be expressed by the following:

$$\Delta\tau = \frac{\pi(1-p^2)^{3/2}(1-q^2)n}{2cv^2(1-\xi)^2\sqrt{(p^2-q^2)}}$$

where c denotes the velocity of light. Assuming by way of example $p = 0.995$, $n = 1.5$, $\xi = 0.9$, $v = 15$ and $$\sqrt{(p^2-q^2)/(1-p^2)} = 20$$

in the above expression, then $\Delta\tau = 0.01$ ns/km. That is, the group delay difference at the propagation by 1 km over the light transmission line becomes only 0.01 nanoseconds or so. In general, in the 5-layer slab transmission line, the group delay difference at the propagation of the modes $TE_o$, $TE_1$, $TM_o$ and $TM_1$ becomes so small as to raise no problem in practical use, and the transmission band becomes wide.

In order to cause degeneration of the propagation modes and also to make the group delay difference $\Delta\tau$ small in the foregoing structure, it is desirable, as is apparent from the above expression, to make q small. In order to make the value the smallest in actuality, air is effective. In case of a hollow structure, the material loss of light becomes the least. Also, in a practical sense, fabrication of the optical fiber of the present invention in FIGS. 2A–2C is significantly simplified.

More specifically, where the optical fiber as shown in FIGS. 2A–2C is to be manufactured, there is a method wherein a large rod whose sectional shape is similar to FIG. 2A and whose refractive index becomes as in FIG. 2C is employed and wherein the rod is drawn out by one end by heating. Herein, the fiber drawn out rod has the property of holding its original shape. The present invention can, accordingly, fabricate the fiber of predetermined shape easily merely by such a procedure and without the necessity for especially crushing the interior (core). Furthermore, $(1-p^2)$ must be made coincident with the design value. In this connection, the layer of the core 4 can be readily formed by the chemical vapor deposition (C.V.D.), the light transmission line of the present invention can be easily produced by combining it with the above manufacturing method.

Figure 5:
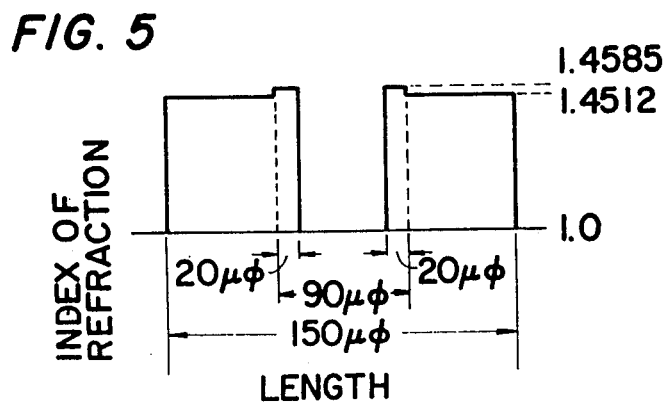
FIG. 5 is a diagram showing the size of a diameter and the distribution of refractive indices in a section of an embodiment of the optical wave guide according to the present invention.

FIG. 5 ilustrates the distribution of refractive indices in an embodiment of the light transmission line according to the present invention, the embodiment being the same in structure as in FIG. 2A. In FIG. 5, the abscissa represents the length in the diameter direction, and the ordinate the refractive index. Various values of the length and the refractive index are shown in the figure.

Figure 6:
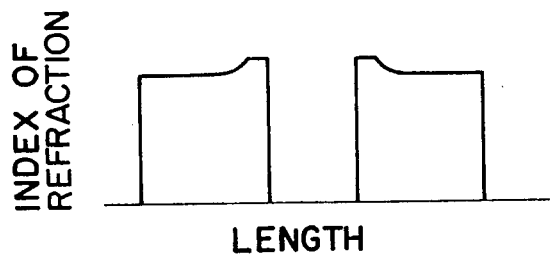
FIG. 6 is a diagram showing the refractive index distribution of another embodiment of the optical wave guide according to the present invention.

FIG. 6 illustrates another embodiment of the light transmission line according to the present invention. By the method of manufacture, the refractive indices of the core portion and the clad portion are made so as to continuously vary. The transmission characteristic obtained is essentially the same as in the case of FIG. 5.

Figure 7:
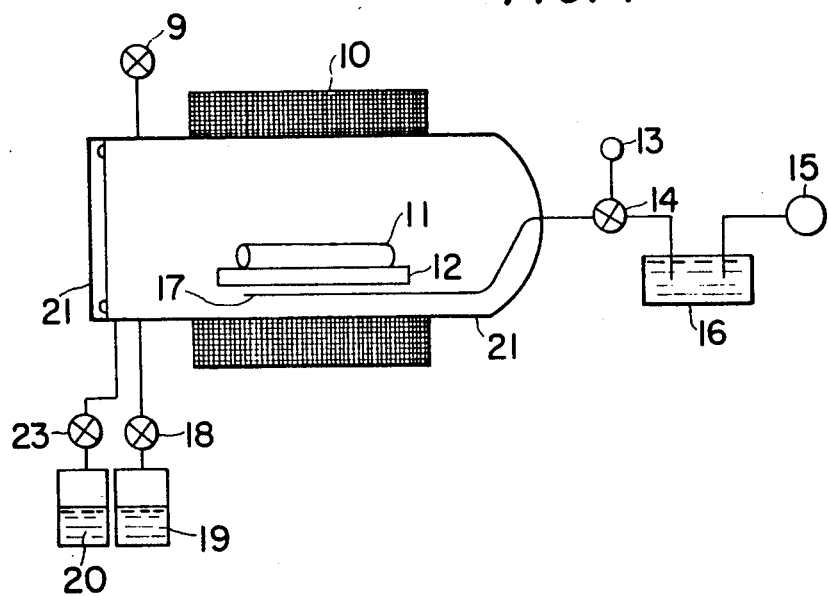
FIGS. 7 and 10 are diagrams for explaining methods of making the optical wave guide according to the present invention.

FIG. 7 illustrates an embodiment of the manufacturing method of the optical wave guide according to the present invention. A hollow, high silica glass tube 11 having an inside diameter of 8 mm$\phi$ and an outside diameter of 10 mm$\phi$ is placed on a quartz specimen stand 12 in a quartz glass tube 21. A cock 14 is opened, and evacuation is carried out by a rotary pump 15. The quartz tube 21 is heated to a temperature of 740°C by an electric furnace 10. After confirming a degree of vacuum of about $3 \times 10^{-2}$ mmHg by a vacuum meter 13, a cock 18 is opened. Tetraethoxysilane 19 being a source for forming $SiO_2$ is kept at room temperature, and fills up the pressure-reduced interior of the quartz tube at a vapor pressure of several mmHg by opening the cock 18. In order to introduce the vapor flow of tetraethoxysilane to a suitable amount, the cock 14 has its opening controlled. The introduced tetraethoxysilane produces $SiO_2$ by thermal decomposition, and $SiO_2$ grows on the inner and outer walls of the hollow, high silica glass tube 11. The thickness of the grown film is a function of the thermal decomposition temperature and the time. For example, an $SiO_2$ film approximately $10\mu$ thick is formed by the reaction in the furnace body at 740°C for 5 hours. After completion of the formation of the film, the cock 14 is closed, a cock 9 is opened, nitrogen gas leaks and the glass tube 11 is removed. Subsequently, the $SiO_2$ film formed on the outer wall of the hollow glass tube is removed by etching.

Figure 8:
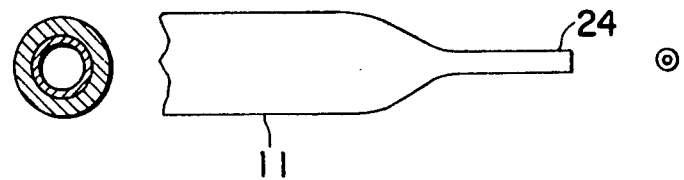
FIG. 8 is a view illustrating a part of the manufacturing process of the optical wave guide according to the present invention.

As is illustrated in FIG. 8, while the tube is being heated and is molten, it is stretched out from one end so as to relatively diminish the sectional area. Then, the $SiO_2$ film of a thickness of several tens $\mu$m as formed on the inner wall of the hollow glass tube becomes several $\mu$m thick. A hollowed core fiber 24 as shown in FIGS. 2A and 2B is obtained.

Although, in the above embodiment, high glass silica is used as the material of the clad, low loss glass such as quartz glass may obviously be employed. As the material for forming the $SiO_2$ film there can be used solutions of organic silane compounds such as $(C_2H_5O)_4$ Si, ethyl triethoxysilane $(C_2H_5)Si(C_2H_5O)_3$, amyl triethoxysilane $C_5H_{11}Si$ $(C_2H_{11}Si(C_2H_5O)_3$, vinyl triethoxysilane $CH_2 = CHSi(C_2H_5O)_3$, phenyl triethoxysilane $C_6H_5Si(C_2H_5O)_3$, dimethyl diethoxysilane $(CH_3)_2Si(C_2H_5O)_2$ and diphenyl diethoxysilane $(C_6H_5)_2Si(C_2H_5O)_2$.

Further, in order to bring the refractive index of the $SiO_2$ film forming the core material into a predetermined value, there can be added an impurity such as Ba, P, Li and Na.

Figure 9:
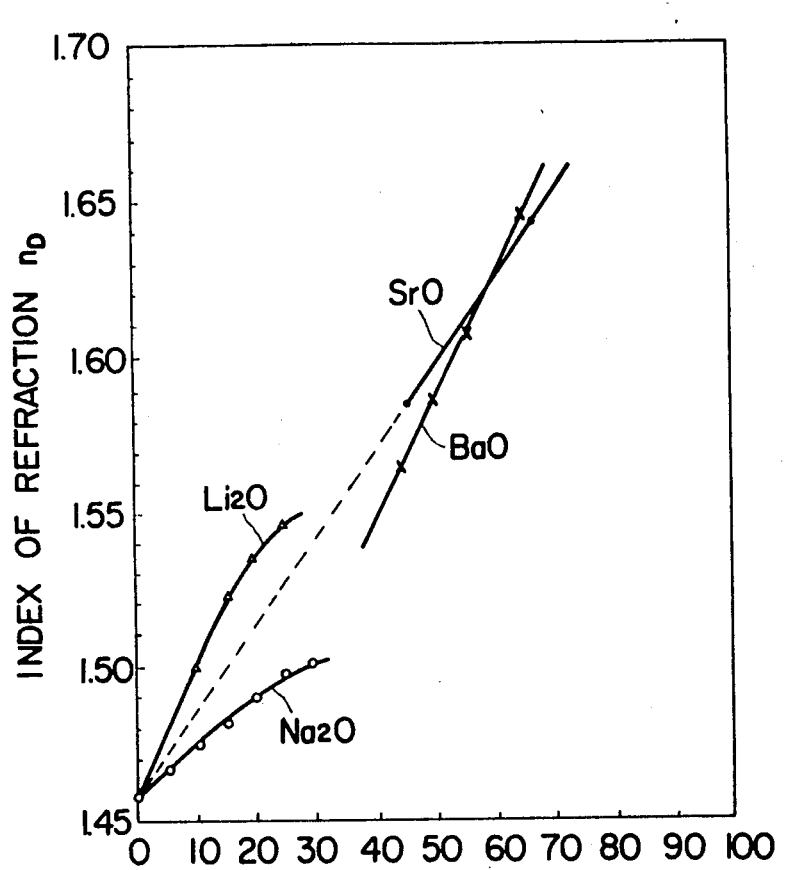
FIG. 9 is a graph illustrating the relations between impurities and the indices of refraction, the impurities being used in order to control the refractive index of a material in the case where the optical wave guide according to the present invention is manufactured.

As the material for controlling the refractive index, there are employed metallic compounds of As, Li, P, Ba, Na, Ga, etc. FIG. 9 shows examples of the refractive index characteristics in the case where they are added to the $SiO_2$ film.

Figure 10:
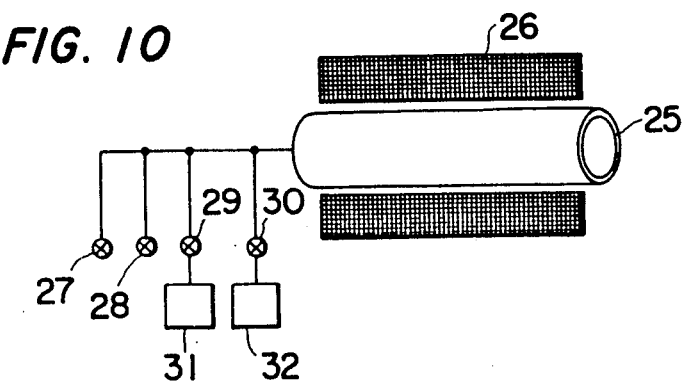

FIG. 10 illustrates an example of the manufacturing method of a material for the hollowed core fiber as based on the vapor reaction process. Referring to the figure, a hollow glass tube 25 having an outside diameter of 10 mm$\phi$ and an inside diameter of 8 mm$\phi$ is heated at a temperature of 450°C by an electric furnace 26. Through the interior of the tube 25,3 l/min. of a carrier gas of nitrogen is passed from a cock 27. Further, 250 l/min. of oxygen is fed from a cock 28. Fed from a cock 29 is 750 ml/min. of $SiH_4$ 31 (it is diluted by the nitrogen and has a concentration of 4 percent). Thus, an $SiO_2$ film is grown on the inner wall of the hollow tube 25. The thickness of the grown film depends on the flow rates of the gases. In this case, the $SiO_2$ film approximately $3\mu$m thick is formed in 30 minutes. After the $SiO_2$ film of a thickness of several tens $\mu$m is formed on the inner wall of the hollow tube, a hollow core is obtained by the same method as in the previous embodiment.

In this method of manufacture, $SiCl_4$, SiBr etc. may be employed in place of $SiH_4$.

As stated above, the optical wave guide of the present invention is so constructed as to be hollow at the central part and to be made up of two layers of transparent dielectrics having different refractive indices, whereby the transmission band is wide and the core diameter is large, making it possible to facilitate the connection between the optical wave guides and the introduction of light into the optical wave guide. A further advantage is that the manufacturing method is easy.

We claim:
1. An optical waveguide through which light transmission is effected, consisting of:
   a. a hollow cylindrically shaped light transmitting medium having a first prescribed index of refraction and a first prescribed thickness; and
   b. a layer of light transmitting material surrounding and disposed on the outer surface of said cylindrically shaped light transmitting medium having an index of refraction slightly lower than that of said first index of refraction and a thickness larger than that of said first prescribed thickness.

2. An optical waveguide according to claim 1, wherein the index of refraction at the boundary between said medium and said layer decreases continuously from said first index continuously in the radial direction across said boundary to said second index of refraction.

3. An optical waveguide according to claim 1, wherein said medium is made of silicon dioxide and said layer is made of high silica glass.

4. An optical waveguide according to claim 1, wherein said medium contains a metallic impurity for controlling said first index of refraction.

5. An optical waveguide according to claim 4, wherein said metallic impurity is an impurity selected from the group consisting of the metallic oxides of Li, P, Ba, Na and Ga.

* * * * *